(12) United States Patent
Kajiyama et al.

(10) Patent No.: US 12,196,926 B2
(45) Date of Patent: Jan. 14, 2025

(54) OPTICAL SYSTEM, IMAGE PICKUP APPARATUS, ON-BOARD SYSTEM, AND MOVING APPARATUS

(71) Applicant: CANON KABUSHIKI KAISHA, Tokyo (JP)

(72) Inventors: Kazuhiko Kajiyama, Tochigi (JP); Naoto Doujou, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 18/323,464

(22) Filed: May 25, 2023

(65) Prior Publication Data
US 2023/0408796 A1 Dec. 21, 2023

(30) Foreign Application Priority Data
Jun. 16, 2022 (JP) .................................. 2022-097517

(51) Int. Cl.
| | | |
|---|---|---|
| G02B 13/00 | (2006.01) | |
| B60Q 9/00 | (2006.01) | |
| G06T 7/50 | (2017.01) | |
| G08G 1/16 | (2006.01) | |
| H04N 25/70 | (2023.01) | |

(52) U.S. Cl.
CPC .......... *G02B 13/0045* (2013.01); *B60Q 9/00* (2013.01); *G02B 13/006* (2013.01); *G06T 7/50* (2017.01); *G08G 1/166* (2013.01); *G06T 2207/30261* (2013.01); *H04N 25/70* (2023.01)

(58) Field of Classification Search
CPC .. G02B 13/00; G02B 13/0045; G02B 13/006; G06T 7/50; G06T 2207/30261; H04N 25/70; H04N 5/30; B60Q 9/00; G08G 1/166

USPC ......................................................... 348/135
See application file for complete search history.

(56) References Cited

U.S. PATENT DOCUMENTS

| | | | | |
|---|---|---|---|---|
| 7,274,518 B1 * | 9/2007 | Tang | ..................... | G02B 13/004 359/772 |
| 7,355,801 B2 * | 4/2008 | Chen | ..................... | G02B 13/004 359/740 |
| 7,436,603 B2 * | 10/2008 | Huang | ..................... | G02B 9/16 359/716 |
| 7,542,212 B2 * | 6/2009 | Toyoda | .......... | G02B 15/145129 359/683 |
| 8,018,659 B2 * | 9/2011 | Mihara | .......... | G02B 15/145113 359/683 |

(Continued)

FOREIGN PATENT DOCUMENTS

| | | |
|---|---|---|
| JP | 2016-118770 A | 6/2016 |
| JP | 2020-046565 A | 3/2020 |

*Primary Examiner* — Trang U Tran
(74) *Attorney, Agent, or Firm* — Carter, DeLuca & Farrell LLP

(57) ABSTRACT

An optical system includes, in order from an object side to an image side, a front unit having positive refractive power, an aperture stop, and a rear unit having positive refractive power. The front unit includes, in order from the object side to the image side, a first aspheric lens, a first negative lens, and a first positive lens. The rear unit includes, in order from the image side to the object side, a second aspheric lens, a second negative lens, and a second positive lens. The first aspheric lens includes an aspheric surface having an inflection point in a section including an optical axis. A predetermined condition is satisfied.

19 Claims, 6 Drawing Sheets

(56) References Cited

U.S. PATENT DOCUMENTS

| | | | |
|---|---|---|---|
| 8,446,678 B2* | 5/2013 | Mihara | G02B 15/145113 |
| | | | 359/689 |
| 9,817,215 B2* | 11/2017 | Zhao | G02B 9/62 |
| 10,042,143 B2* | 8/2018 | Wu | G02B 13/06 |
| 10,295,789 B2* | 5/2019 | Huang | G02B 9/34 |
| 10,634,872 B2 | 4/2020 | Doujou | |
| 10,830,998 B2* | 11/2020 | Tabata | G02B 13/0045 |
| 11,340,430 B2* | 5/2022 | Chen | G02B 9/64 |
| 11,927,726 B2* | 3/2024 | Seo | G02B 9/62 |
| 2015/0043091 A1* | 2/2015 | Bone | G02B 13/18 |
| | | | 359/708 |
| 2021/0396956 A1 | 12/2021 | Doujou | |

* cited by examiner

OPTICAL SYSTEM, IMAGE PICKUP APPARATUS, ON-BOARD SYSTEM, AND MOVING APPARATUS

BACKGROUND

Technical Field

One of the aspects of the disclosure relates to an optical system, an image pickup apparatus, an on-board system (in-vehicle system), and a moving apparatus.

Description of Related Art

In-vehicle cameras for front monitoring have conventionally required a plurality of cameras, such as a telephoto camera for distant monitoring and a wide-angle camera for front oblique monitoring of a rushing pedestrian or the like. Japanese Patent Laid-Open No. 2020-46565 discloses a foveal optical system that combines two cameras into one, controls distortion, and makes a focal length in the central area (or central focal length) longer than that in the periphery.

The optical system disclosed in Japanese Patent Laid-Open No. 2020-46565 has difficulty in further extending the focal length in the central area and in providing higher-resolution imaging of a distant object.

SUMMARY

One of the aspects of the present disclosure provides an optical system that has a wide angle of view and a long focal length in a central area, and can provide high-resolution imaging.

An optical system according to one aspect of the disclosure includes, in order from an object side to an image side, a front unit having positive refractive power, an aperture stop, and a rear unit having positive refractive power. The front unit includes, in order from the object side to the image side, a first aspheric lens, a first negative lens, and a first positive lens. The rear unit includes, in order from the image side to the object side, a second aspheric lens, a second negative lens, and a second positive lens. The first aspheric lens includes an aspheric surface having an inflection point in a section including an optical axis. The following inequality is satisfied:

$$2.5 \leq fG1/fG2 \leq 20.0$$

where fG1 is a focal length of the front unit, and fG2 is a focal length of the rear unit. An image pickup apparatus, an on-board system, and a moving apparatus each having the above optical system also constitute another aspect of the disclosure.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Figure 1:
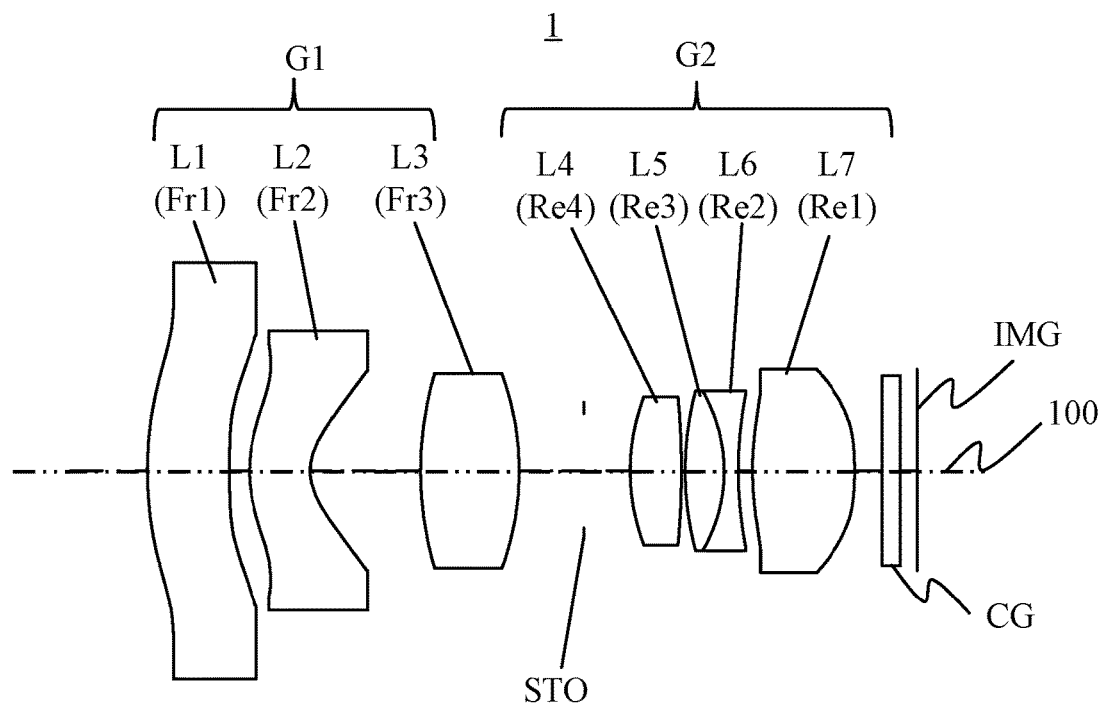
FIG. 1 is a sectional view of an optical system according to Example 1.
Figure 2:
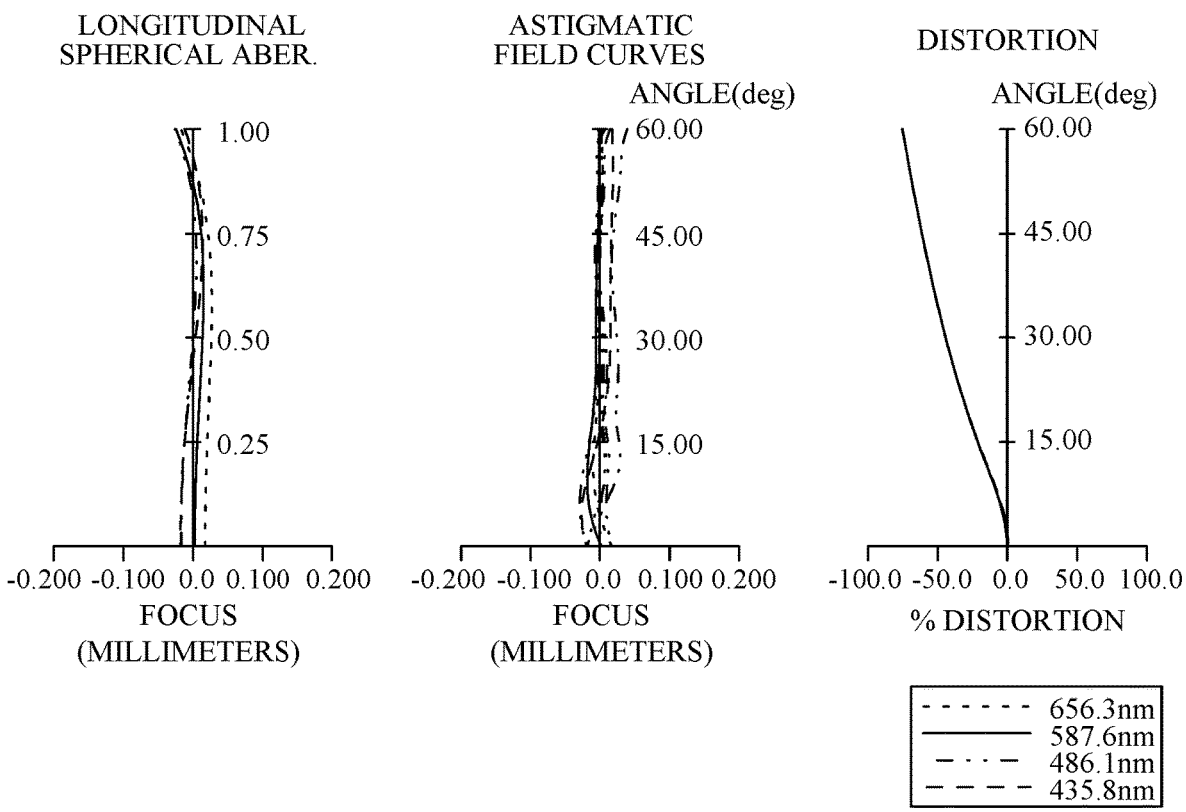
FIG. 2 is an aberration diagram of the optical system according to Example 1.
Figure 3:
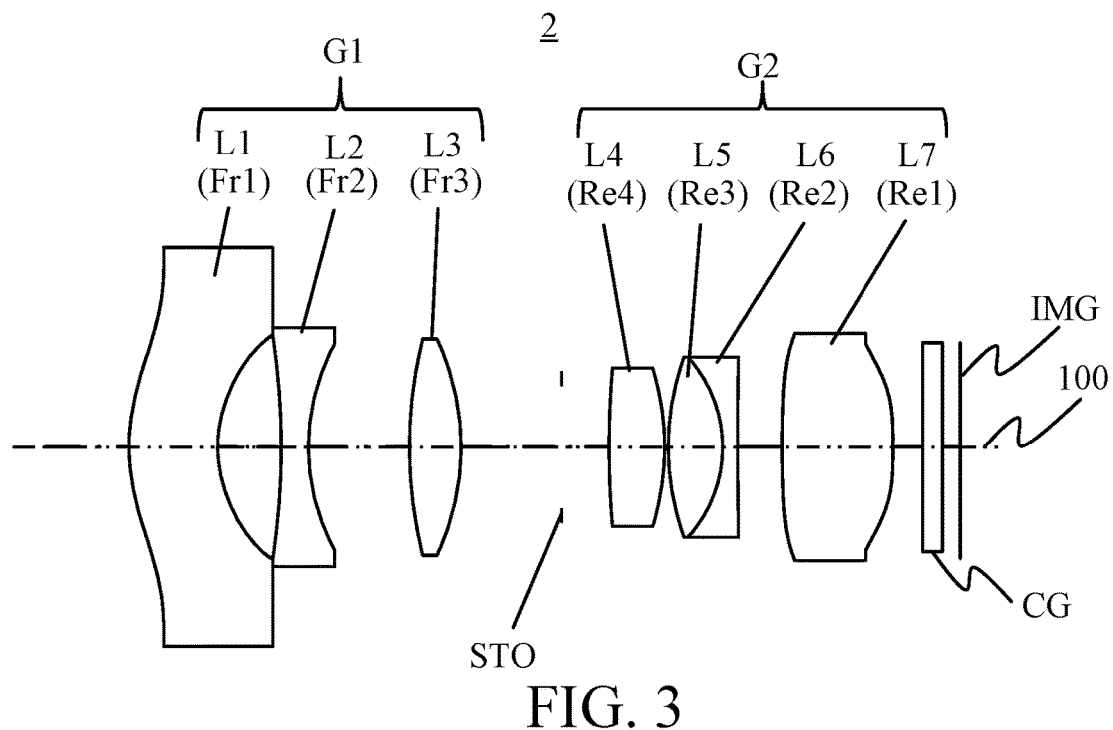
FIG. 3 is a sectional view of an optical system according to Example 2.
Figure 4:
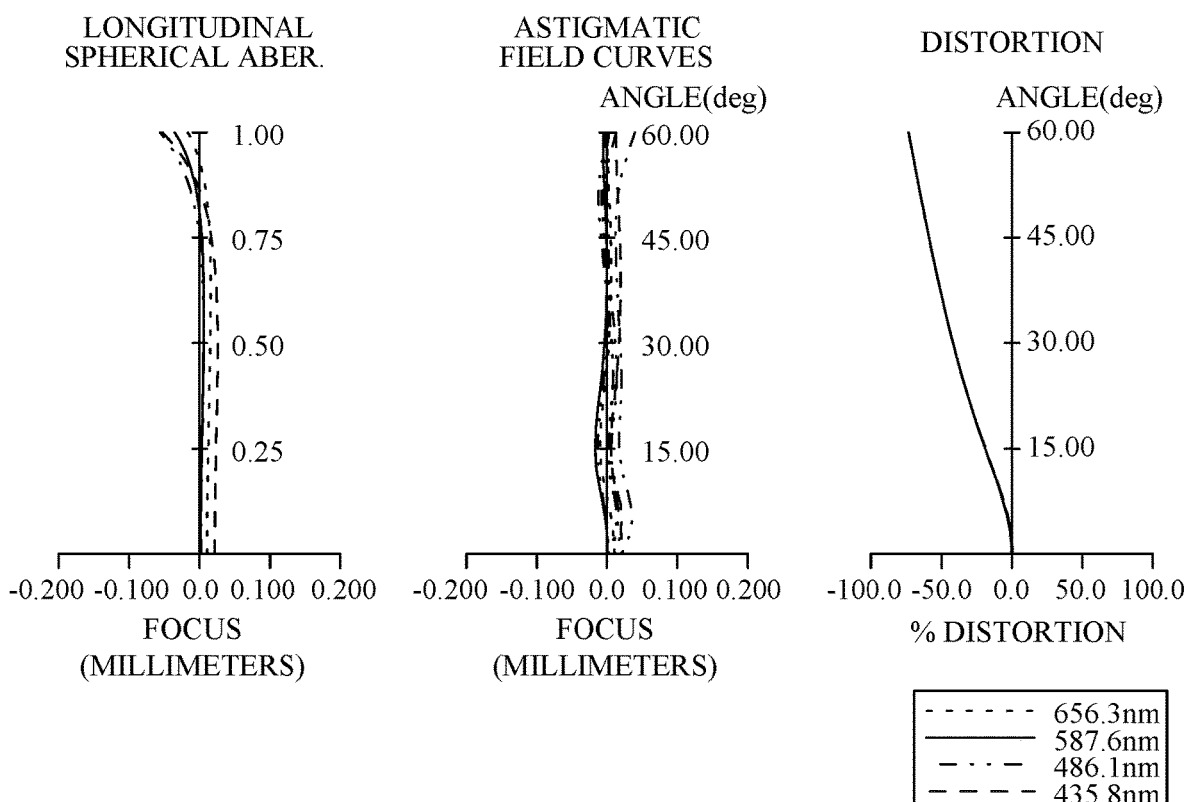
FIG. 4 is an aberration diagram of the optical system according to Example 2.
Figure 5:
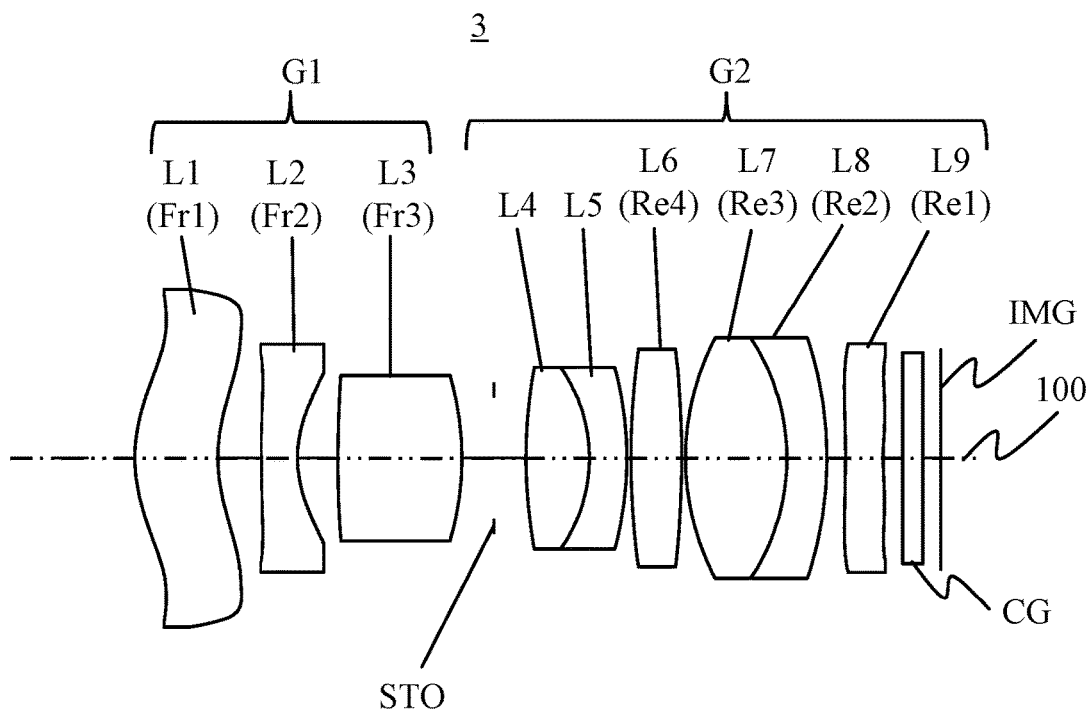
FIG. 5 is a sectional view of an optical system according to Example 3.
Figure 6:
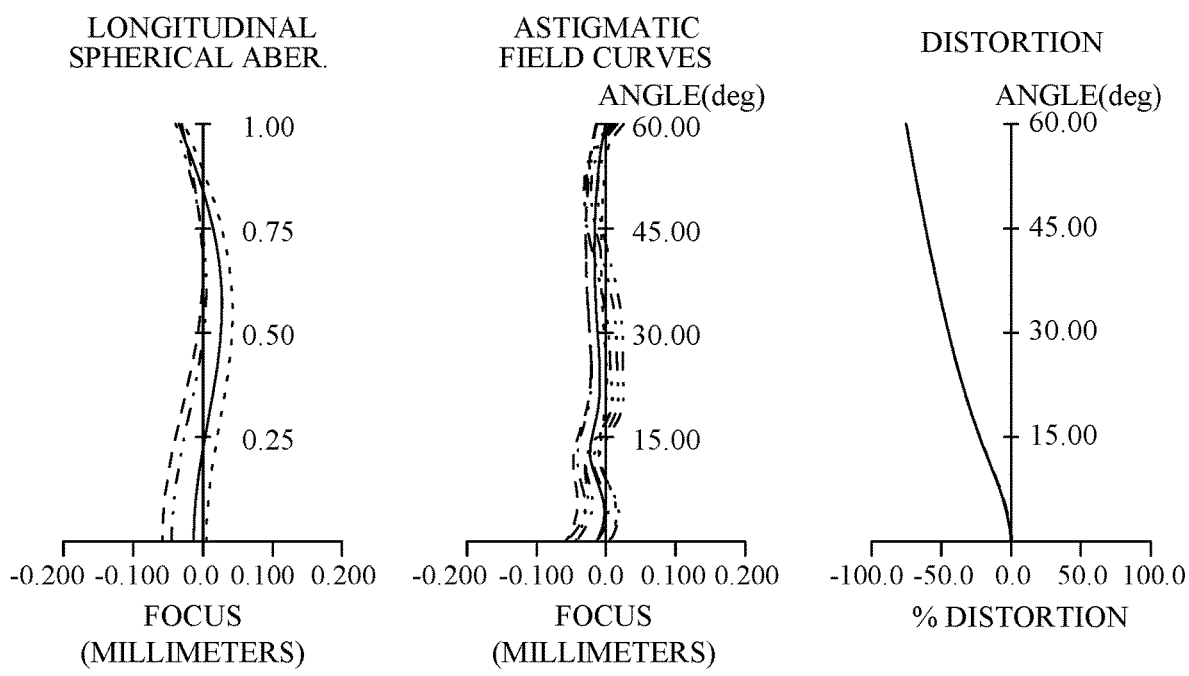
FIG. 6 is an aberration diagram of the optical system according to Example 3.
Figure 7:
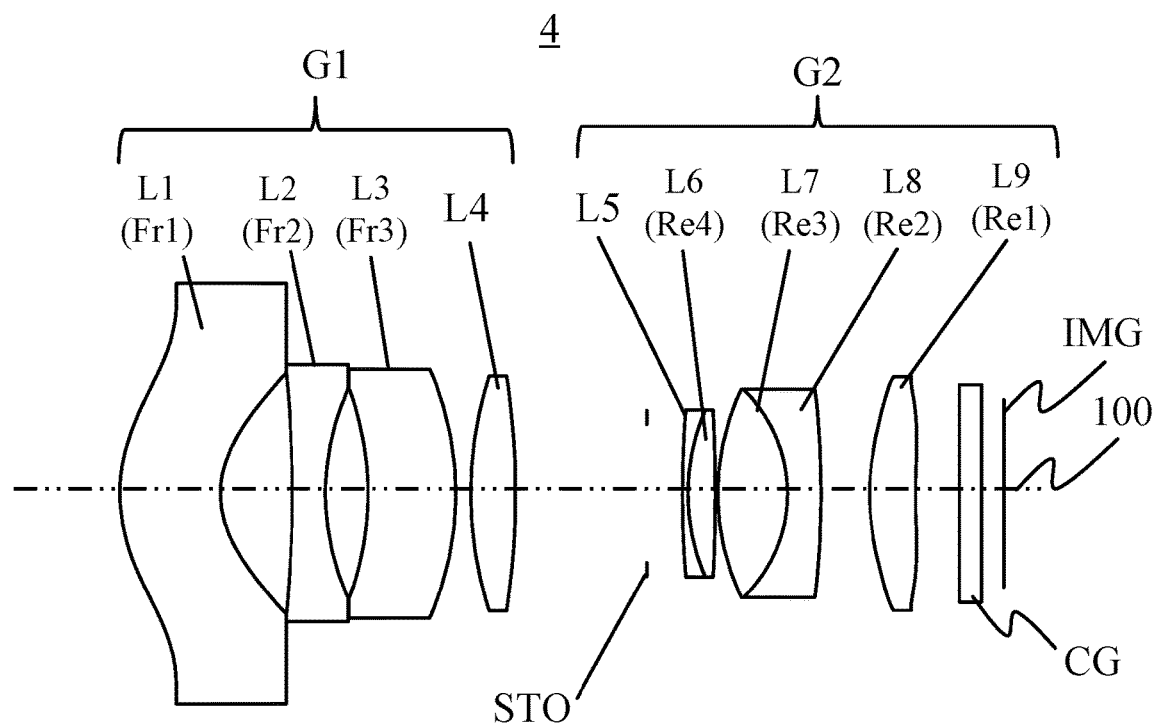
FIG. 7 is a sectional view of an optical system according to Example 4.
Figure 8:
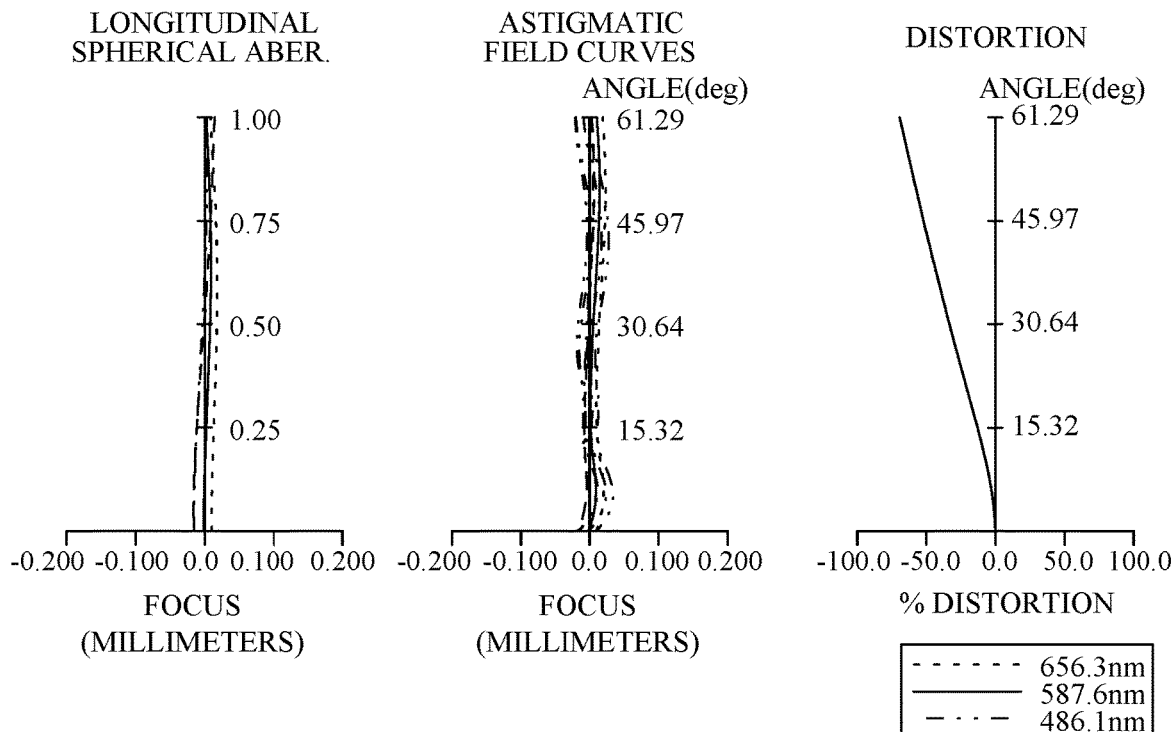
FIG. 8 is an aberration diagram of the optical system according to Example 4.

FIG. 1 is a sectional view of an optical system 1 according to Example 1. FIG. 2 is a longitudinal aberration diagram of the optical system 1. FIG. 3 is a sectional view of an optical system 2 according to Example 2. FIG. 4 is a longitudinal aberration diagram of the optical system 2. FIG. 5 is a sectional view of an optical system 3 according to Example 3. FIG. 6 is a longitudinal aberration diagram of the optical system 3. FIG. 7 is a sectional view of an optical system 4 according to Example 4. FIG. 8 is a longitudinal aberration diagram of the optical system 4.

In the sectional views of FIGS. 1, 3, 5, and 7, a left side is an object side, and a right side is an image side. CG represents a cover glass (an optical block corresponding to an optical filter or the like). IMG represents an image plane (imaging plane or photoelectric conversion plane) on which an image sensor (photoelectric conversion element) such as a CCD sensor or a CMOS sensor is placed. The longitudinal aberration diagrams of FIGS. 2, 4, 6, and 8 illustrate spherical aberration amounts, curvature of field amounts, and a distortion amount. The spherical aberration amounts and field curvature amounts are represented in millimeters. Each longitudinal aberration diagram illustrates aberrations for 656.3 nm, 587.6 nm, 486.1 nm, and 435.8 nm. Unless otherwise specified, the lens configuration will be described in order of arrangement from the object side to the image side.

Each of the optical systems 1, 2, 3, and 4 according to examples is an optical system (imaging optical system) that includes, in order from the object side to the image side (along a direction of an optical axis 100), a front unit G1 having positive refractive power, an aperture stop (diaphragm) STO, and a rear unit G2 having positive refractive power. The front unit G1 includes, in order from the object side to the image side, a first aspheric lens Fr1, a first concave lens (first negative lens) Fr2, and a first convex lens (first positive lens) Fr3. The rear unit G2 includes, in order from the image side to the object side, a second aspheric lens Re1, a second concave lens (second negative lens) Re2, and a second convex lens (second positive lens) Re3. The following inequality (1) is satisfied:

$$2.5 \leq fG1/fG2 \leq 20.0 \quad (1)$$

where fG1 is a focal length of the front unit G1, and fG2 is a focal length of the rear unit G2.

Due to the thus-configured front unit G1, the optical system according to each example is likely to have a long focal length in the central area and a wide angle of view. The thus-configured rear unit G2 can reduce the influence on curvature of field and lateral chromatic aberration caused by the increased focal length in the central area while a wide angle of view is maintained.

The optical system according to each example can have a long focal length in the central area and a wide angle of view because the focal length of the front unit G1 and the focal length of the rear unit G2 are properly set so as to satisfy inequality (1). In a case where the value fG1/fG2 is lower than the lower limit of inequality (1), the power (refractive power) of the front unit G1 becomes too strong, and it becomes difficult to increase the focal length in the central area. In a case where the value fG1/fG2 is higher than the upper limit of inequality (1), the power of the front unit G1 becomes too weak, the overall length cannot be reduced, and the optical system becomes large.

Inequality (1) may be replaced with inequality (1a) below:

$$2.6 \leq fG1/fG2 \leq 19.0 \tag{1a}$$

Inequality (1) may be replaced with inequality (1b) below:

$$2.8 \leq fG1/fG2 \leq 18.0 \tag{1b}$$

In each example, the first aspheric lens Fr1 may include an aspheric (lens) surface having an inflection point in the radial direction (in a section including the optical axis). The aspheric surface having the inflection point included in the first aspheric lens Fr1 can efficiently provide a long focal length while a wide angle of view is maintained, and configure the optical system with a small number of lenses.

In each example, the first concave lens Fr2 may include an aspheric (lens) surface having an inflection point in the radial direction (in the section including the optical axis). The aspheric surface having the inflection point included in the first concave lens Fr2 can reduce the surface shape change in each aspheric surface and the difficulty of manufacturing the lens, in a case where the surface shape change in the first aspheric lens Fr1 is large.

In each example, the following inequality (2) may be satisfied:

$$2.5 \leq |fFr1/fFr2| \leq 10.0 \tag{2}$$

where fFr1 is a focal length of the first aspheric lens Fr1, and fFr2 is a focal length of the first concave lens Fr2.

Inequality (2) is an inequality for extending a focal length in the central area while a wide angle of view is maintained. In a case where the value |fFr1/fFr2| is lower than the lower limit of inequality (2), the power of the first aspheric lens Fr1 becomes too strong to extend the focal length in the central area. In a case where the value |fFr1/fFr2| is higher than the upper limit of inequality (2) because the power of the first concave lens Fr2 becomes too loose and the wide-angle scheme becomes difficult.

Inequality (2) may be replaced with inequality (2a):

$$2.7 \leq |fFr1/fFr2| \leq 8.5 \tag{2a}$$

Inequality (2) may be replaced with inequality (2b):

$$3.0 \leq |fFr1/fFr2| \leq 7.0 \tag{2b}$$

In each example, the first concave lens Fr2 may have a concave (lens) surface on the image side. The concave surface on the image side of the first concave lens Fr2 can properly increase the power of the first concave lens Fr2 and easily extend the focal length in the central area while a wide angle of view is maintained.

Each example provides a third convex lens (third positive lens) Re4 disposed on the object side of the second convex lens Re3. The third convex lens Re4 in the rear unit G2 disposed closer to the image plane than the aperture stop STO can easily produce barrel distortion and extend the central focal length while a wide angle of view is maintained.

In each example, at least one of the first aspheric lens Fr1 and the second aspheric lens Re1 is a resin lens (lens made of resin). The resin lens includes a material containing resin (plastic) as a main component, not only those made of resin exclusively but also those containing a small amount of substances (impurities) other than resin. The resin lens has a larger temperature coefficient in the plus direction than that of a general glass lens, and using it as a convex lens and combining it with a glass lens is beneficial to focus correction in a case where temperature changes. In a case where both the first aspheric lens Fr1 and the second aspheric lens Re1 are convex lenses, at least one of them may be a resin lens because it works effectively for focus correction in a case where temperature changes.

Each example can provide an optical system that has a wide angle of view and a long focal length in a central area, and can perform high-resolution imaging for the central area. The optical system according to each example will be described in detail below.

Example 1

Referring now to FIGS. 1 and 2, a description will be given of the optical system 1 according to Example 1. FIG. 1 is a sectional view of the optical system 1. FIG. 2 is a longitudinal aberration diagram of the optical system 1. The optical system 1 includes, in order from the object side to the image side, a first lens L1, a second lens L2, a third lens L3, an aperture stop STO, a fourth lens L4, a fifth lens L5, a sixth lens L6, and a seventh lens L7.

The front unit G1 includes, in order from the object side to the image side, the first lens L1 as an aspheric convex lens (first aspheric lens Fr1), the second lens L2 (first concave lens Fr2) having an aspheric surface, and the third lens L3 (first convex lens Fr3). The rear unit G2 includes the seventh lens L7 (second aspheric lens Re1), the sixth lens L6 (second concave lens Re2), the fifth lens L5 (second convex lens Re3), and the fourth lens L4 (third convex lens Re4). A light beam from an unillustrated object passes through the cover glass CG and forms an image on the image plane IMG.

In the first lens L1 (first aspheric lens Fr1), each of the aspheric (lens) surface on the object side and the aspheric (lens) surface on the image side has an inflection point in the radial direction (in the section including the optical axis). In the second lens L2 (first concave lens Fr2), the aspheric (lens) surface on the object side has an inflection point in the radial direction (in a section including the optical axis). The first lens L1 (first aspheric lens Fr1) and the seventh lens L7 (second aspheric lens Re1) are resin lenses. The second lens L2 (first concave lens Fr2) has a concave (lens) surface on the image side. The fifth lens L5 (second convex lens Re3) and the sixth lens L6 (second concave lens Re2) are cemented together to form a cemented lens. Both surfaces of the first lens L1 (first aspheric lens Fr1) and the seventh lens L7 (second aspheric lens Re1) are aspheric. The optical system 1 according to this example has a central focal length of 11.4 mm, an overall angle of view of 120°, and an F-number (Fno) of 1.8.

Example 2

Referring now to FIGS. 3 and 4, a description will be given of the optical system 2 according to Example 2. FIG.

3 is a sectional view of the optical system 2. FIG. 4 is a longitudinal aberration diagram of the optical system 2. The optical system 2 includes, in order from the object side to the image side, a first lens L1, a second lens L2, a third lens L3, an aperture stop STO, a fourth lens L4, a fifth lens L5, a sixth lens L6, and a seventh lens L7.

The front unit G1 includes, in order from the object side to the image side, the first lens L1 (first aspheric lens Fr1) as an aspheric concave lens, the second lens L2 (first concave lens Fr2), and the third lens L3 (first convex lens Fr3). The rear unit G2 includes the seventh lens L7 (second aspheric lens Re1), the sixth lens L6 (second concave lens Re2), the fifth lens L5 (second convex lens Re3), and the fourth lens L4 (third convex lens Re4). A light beam from an unillustrated object passes through the cover glass CG and forms an image on the image plane IMG.

In the first lens L1 (first aspheric lens Fr1), the aspheric (lens) surface on the object side has an inflection point in the radial direction (in the section including the optical axis). The first lens L1 (first aspheric lens Fr1) and the seventh lens L7 (second aspheric lens Re1) are resin lenses. The second lens L2 (first concave lens Fr2) has a concave (lens) surface on the image side. The fifth lens L5 (second convex lens Re3) and the sixth lens L6 (second concave lens Re2) are cemented together to form a cemented lens. Both lens surfaces of the first lens L1 (first aspheric lens Fr1) and both lens surfaces of the seventh lens L7 (second aspheric lens Re1) are aspheric. The optical system 2 according to this example has a central focal length of 11.6 mm, an overall angle of view of 120°, and an F-number (Fno) of 1.8.

Example 3

Referring now to FIGS. 5 and 6, a description will be given of the optical system 3 according to Example 3. FIG. 5 is a sectional view of the optical system 3. FIG. 6 is a longitudinal aberration diagram of the optical system 3. The optical system 3 includes, in order from the object side to the image side, a first lens L1, a second lens L2, a third lens L3, an aperture stop STO, a fourth lens L4, a fifth lens L5, a sixth lens L6, a seventh lens L7, an eighth lens L8, and a ninth lens L9.

The front unit G1 includes, in order from the object side to the image side, the first lens L1 (first aspheric lens Fr1) as an aspheric convex lens, the second lens L2 (first concave lens Fr2) having an aspheric shape, and the third lens L3 (first convex lens Fr3). The rear unit G2 includes, in order from the image side to the object side, the ninth lens L9 (second aspheric lens Re1), the eighth lens L8 (second concave lens Re2), the seventh lens L7 (second convex lens Re3), and the sixth lens L6 (third convex lens Re4), the fifth lens L5, and the fourth lens L4. The ninth lens L9 is a concave lens, the fifth lens L5 is a concave lens (third negative lens), and the fourth lens L4 is a convex lens (fourth positive lens). A light beam from an unillustrated object passes through the cover glass CG and forms an image on the image plane IMG.

In the first lens L1 (first aspheric lens Fr1), each of the aspheric (lens) surface on the object side and the aspheric (lens) surface on the image side has an inflection point in the radial direction (in the section including the optical axis). In the second lens L2 (first concave lens Fr2), the aspheric (lens) surface on the object side has an inflection point in the radial direction (in the section including the optical axis). The first lens L1 (first aspheric lens Fr1) and the ninth lens L9 (second aspheric lens Re1) are resin lenses. The second lens L2 (first concave lens Fr2) has a concave (lens) surface on the image side. The fourth lens L4 and the fifth lens L5 are cemented together to form a cemented lens. The seventh lens L7 (second convex lens Re3) and the eighth lens L8 (second concave lens Re2) are cemented together to form a cemented lens. Both lens surfaces of the first lens L1 (first aspheric lens Fr1) and both lens surfaces of the ninth lens L9 (second aspheric lens Re1) are aspheric. The optical system 3 according to this example has a central focal length of 11.4 mm, an overall angle of view of 120°, and an F-number (Fno) of 1.8.

Example 4

Referring now to FIGS. 7 and 8, a description will be given of the optical system 4 according to Example 4. FIG. 7 is a sectional view of the optical system 4. FIG. 8 is a longitudinal aberration diagram of the optical system 4. The optical system 4 includes, in order from the object side to the image side, a first lens L1, a second lens L2, a third lens L3, an aperture stop STO, a fourth lens L4, a fifth lens L5, a sixth lens L6, a seventh lens L7, an eighth lens L8, and a ninth lens L9.

The front unit G1 includes, in order from the object side to the image side, the first lens L1 (first aspheric lens Fr1) as an aspheric concave lens, the second lens L2 (first concave lens Fr2), the third lens L3 (first convex lens Fr3), and the fourth lens L4. The rear unit G2 includes, in order from the image side to the object side, the ninth lens L9 (second aspheric lens Re1) as a convex lens, the eighth lens L8 (second concave lens Re2), the seventh lens L7 (second convex lens Re3), the sixth lens L6 (third convex lens Re4), and the fifth lens L5. The fifth lens L5 is a concave lens (third negative lens), and the fourth lens L4 is a convex lens (fourth positive lens). A light beam from an unillustrated object passes through the cover glass CG and forms an image on the image plane IMG.

In the first lens L1 (first aspheric lens Fr1), the aspheric surface on the object side has an inflection point in the radial direction (in a section including the optical axis). The ninth lens L9 (second aspheric lens Re1) is a resin lens. The second lens L2 (first concave lens Fr2) has a concave (lens) surface on the image side. The fifth lens L5 and the sixth lens L6 are cemented together to form a cemented lens. The seventh lens L7 (second convex lens Re3) and the eighth lens L8 (second concave lens Re2) are cemented together to form a cemented lens. Both lens surfaces of the first lens L1 (first aspheric lens Fr1) and both lens surfaces of the ninth lens L9 (second aspheric lens Re1) are aspheric. The optical system 4 according to this example has a central focal length of 7.5 mm, an overall angle of view of 120°, and an F-number (Fno) of 1.8.

A description will now be given of numerical examples 1 to 4 corresponding to Examples 1 to 4. In each numerical example, a surface number is the order of optical surfaces counted from the object side to the image side. r represents a radius of curvature of an i-th optical surface counted from the object side. d represents a distance (lens thickness or air distance) between an i-th surface and an (i+1)-th surface. Nd and vd are a refractive index and an Abbe number of the i-th lens material, respectively. The Abbe number vd of a certain material is expressed as follows:

$$vd=(Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

An asterisk "*" means an aspheric surface.

The aspheric shape is expressed by the following equation (3). In equation (3), z is a coordinate in the optical axis direction, c is a curvature (reciprocal of a radius of curvature r), h is a height from an optical axis, k is a conic coefficient, A, B, C, D, E, . . . are fourth-order, sixth-order, eighth-order, tenth-order, twelfth-order, . . . aspheric coefficients.

$$z = \frac{ch^2}{1+\sqrt{1-(1+k^2)c^2h^2}} + Ah^4 + Bh^6 + Ch^8 + Dh^{10} + Eh^{12} + \ldots$$

Numerical Example 1

| VARIOUS DATA | | |
|---|---|---|
| Focal Length | | 11.4 |
| Fno | | 1.8 |
| Half Angle of View | | ±60° |

| Surface Data | | | | |
|---|---|---|---|---|
| Surface No | r | d | Nd | vd |
| 1* | 22.97 | 4.80 | 1.536 | 56.0 |
| 2* | 206.08 | 1.18 | | |
| 3* | 8.59 | 3.55 | 1.583 | 59.4 |
| 4* | 3.07 | 6.44 | | |
| 5 | 19.99 | 5.76 | 1.589 | 61.2 |
| 6 | −16.24 | 1.30 | | |
| 7 | ∞ | 2.50 | | |
| 8 (Aperture Stop) | ∞ | 2.50 | | |
| 9 | ∞ | 0.21 | | |
| 10 | 12.14 | 3.00 | 1.694 | 53.2 |
| 11 | −41.94 | 0.20 | | |
| 12 | 17.94 | 2.29 | 1.595 | 67.7 |
| 13 | −9.27 | 0.81 | 2.001 | 29.1 |
| 14 | 23.10 | 0.82 | | |
| 15* | 16.53 | 6.00 | 1.536 | 56.0 |
| 16* | −26.36 | 1.60 | | |
| 17 | ∞ | 1.08 | 1.517 | 64.2 |
| 18 | ∞ | 0.96 | | |

| Aspheric Coefficients | | | | | | |
|---|---|---|---|---|---|---|
| Surface No | K | A | B | C | D | E |
| 1 | −4.960E+00 | 1.801E−04 | −1.515E−06 | −3.938E−08 | 4.738E−10 | −1.428E−12 |
| 2 | 0.000E+00 | 1.289E−03 | −2.155E−05 | 9.639E−08 | −6.271E−10 | 1.269E−11 |
| 3 | 0.000E+00 | −3.050E−04 | −2.410E−05 | 6.440E−08 | 5.467E−09 | −5.508E−11 |
| 4 | −8.501E−01 | −3.599E−03 | 1.011E−05 | 1.139E−06 | −3.006E−08 | 2.187E−10 |
| 15 | 1.000E+00 | −4.403E−04 | 1.099E−05 | −1.188E−06 | 4.888E−08 | −7.735E−10 |
| 16 | 0.000E+00 | −4.024E−03 | 2.001E−04 | −6.527E−06 | 1.232E−07 | −1.024E−09 |

Numerical Example 2

| VARIOUS DATA | |
|---|---|
| Focal Length | 10.6 |
| Fno | 1.8 |
| Half Angle of View | ±60° |

| Surface Data |
|---|

-continued

VARIOUS DATA

| Surface No | r | d | Nd | vd |
|---|---|---|---|---|
| 1* | 11.07 | 4.80 | 1.536 | 56.0 |
| 2* | 7.12 | 3.43 | | |
| 3 | −40.84 | 1.50 | 1.583 | 59.4 |
| 4 | 11.76 | 5.45 | | |
| 5 | 24.16 | 2.80 | 1.589 | 61.2 |
| 6 | −13.78 | 2.92 | | |
| 7 | ∞ | 2.50 | | |
| 8 (Aperture Stop) | ∞ | 2.50 | | |
| 9 | ∞ | 0.10 | | |
| 10 | 50.71 | 3.00 | 1.694 | 53.2 |
| 11 | −14.49 | 0.20 | | |
| 12 | 14.39 | 2.95 | 1.595 | 67.7 |
| 13 | −7.30 | 0.81 | 2.001 | 29.1 |
| 14 | 302.78 | 2.40 | | |
| 15* | 74.69 | 6.00 | 1.536 | 56.0 |
| 16* | −95.42 | 1.60 | | |
| 17 | ∞ | 1.08 | 1.517 | 64.2 |
| 18 | ∞ | 0.96 | | |

Aspheric Coefficients

| Surface No | K | A | B | C | D | E |
|---|---|---|---|---|---|---|
| 1 | −3.505E−02 | −2.866E−04 | −2.441E−06 | −1.584E−09 | 3.108E−10 | −1.950E−12 |
| 2 | 0.000E+00 | −4.241E−04 | −6.171E−06 | 4.986E−07 | −1.593E−08 | 2.373E−10 |
| 15 | 1.000E+00 | 9.040E−05 | 1.135E−05 | −7.992E−07 | 3.482E−08 | −4.734E−10 |
| 16 | 0.000E+00 | −4.157E−03 | 1.812E−04 | −4.979E−06 | 8.383E−08 | −5.717E−10 |

Numerical Example 3

VARIOUS DATA

| | |
|---|---|
| Focal Length | 11.4 |
| Fno | 1.8 |
| Half Angle of View | ±60° |

Surface Data

| Surface No | r | d | Nd | vd |
|---|---|---|---|---|
| 1* | 8.64 | 4.42 | 1.536 | 56.0 |
| 2* | 9.00 | 2.34 | | |
| 3* | 110.09 | 1.94 | 1.583 | 59.5 |
| 4* | 6.65 | 2.14 | | |
| 5 | 57.00 | 6.61 | 1.667 | 33.1 |
| 6 | −15.42 | 1.70 | | |
| 7 (Aperture Stop) | ∞ | 1.70 | | |
| 8 | 25.74 | 3.42 | 1.516 | 64.1 |
| 9 | −8.37 | 2.00 | 1.805 | 25.4 |
| 10 | −18.51 | 0.21 | | |
| 11 | 41.75 | 2.70 | 1.516 | 64.1 |
| 12 | −51.97 | 0.20 | | |
| 13 | 13.76 | 5.40 | 1.595 | 67.7 |
| 14 | −11.56 | 2.14 | 1.847 | 23.8 |
| 15 | −20.16 | 1.01 | | |
| 16* | −83.33 | 2.00 | 1.536 | 56.0 |
| 17* | 12.86 | 1.04 | | |
| 18 | ∞ | 1.08 | 1.517 | 64.2 |
| 19 | ∞ | 0.96 | | |

Aspheric Coefficients

| Surface No | K | A | B | C | D | E |
|---|---|---|---|---|---|---|

-continued

VARIOUS DATA

| 1 | −6.000E+00 | 7.092E−04 | −2.794E−05 | 2.978E−07 | −1.132E−09 | 1.078E−12 |
|---|---|---|---|---|---|---|
| 2 | −1.000E+00 | −4.096E−04 | −1.385E−05 | 3.330E−07 | −7.892E−09 | 1.700E−10 |
| 3 | 0.000E+00 | 6.186E−04 | −4.435E−05 | 7.121E−07 | −3.561E−09 | −1.204E−11 |
| 4 | 0.000E+00 | 1.102E−04 | −8.947E−05 | 2.420E−06 | −3.218E−08 | 1.477E−10 |
| 15 | 0.000E+00 | −4.507E−04 | 5.794E−05 | −1.738E−06 | 1.783E−08 | 9.118E−11 |
| 16 | 0.000E+00 | −5.740E−03 | 3.202E−04 | −8.270E−06 | 7.985E−08 | 4.866E−10 |

| Surface No | F |
|---|---|
| 1 | −5.149E−15 |
| 2 | −1.338E−12 |
| 3 | 5.447E−13 |
| 4 | 3.9942E−12 |
| 15 | −1.747E−12 |
| 16 | −8.016E−12 |

Numerical Example 4

VARIOUS DATA

| Focal Length | 7.5 |
|---|---|
| Fno | 1.8 |
| Half Angle of View | ±60° |

Surface Data

| Surface No | r | d | Nd | vd |
|---|---|---|---|---|
| 1* | 7.41 | 4.51 | 1.583 | 59.5 |
| 2* | 4.35 | 3.24 | | |
| 3 | −51.95 | 1.50 | 1.745 | 25.3 |
| 4 | 11.42 | 1.91 | | |
| 5 | −13.33 | 3.93 | 1.988 | 20.8 |
| 6 | −13.95 | 0.66 | | |
| 7 | 17.24 | 2.01 | 1.824 | 41.3 |
| 8 | −34.74 | 1.70 | | |
| 9 | ∞ | 4.20 | | |
| 10 (Aperture Stop) | ∞ | 1.60 | | |
| 11 | 45.21 | 0.25 | 1.738 | 26.8 |
| 12 | 9.43 | 1.23 | 1.603 | 66.1 |
| 13 | −65.94 | 0.10 | | |
| 14 | 10.79 | 3.13 | 1.595 | 67.7 |
| 15 | −6.55 | 1.50 | 1.720 | 34.7 |
| 16 | −39.62 | 2.18 | | |
| 17* | 10.41 | 2.08 | 1.536 | 56.0 |
| 18* | 21.80 | 1.96 | | |
| 19 | ∞ | 1.00 | 1.517 | 64.2 |
| 20 | ∞ | 1.00 | | |

Aspheric Coefficients

| Surface No | K | A | B | C | D |
|---|---|---|---|---|---|
| 1 | −4.225E+00 | 8.363E−04 | −2.673E−05 | 2.546E−07 | −8.357E−10 |
| 2 | −5.429E−01 | −6.231E−04 | −6.369E−05 | 1.748E−06 | −2.765E−08 |
| 17 | 1.980E+00 | −1.096E−03 | 4.080E−05 | −2.737E−06 | 5.513E−08 |
| 18 | 0.000E+00 | −2.806E−03 | 1.357E−04 | −5.632E−06 | 1.081E−07 |

Table 1 summarizes numerical values of inequalities in each example.

| | Example 1 | Example 2 | Example 3 | Example 4 |
|---|---|---|---|---|
| Focal Length fG1 of Front Unit | 53.0 | 54.9 | 211.5 | 32.9 |
| Focal Length fG2 of Rear Unit | 14.4 | 16.3 | 12.2 | 11.4 |
| fG1/fG2 | 3.7 | 3.4 | 17.4 | 2.9 |
| Focal Length fFr1 of First Lens in Front Unit | 47.9 | −64.6 | 76.2 | −39.5 |
| Focal Length fFr2 of Second Lens in Front Unit | −10.8 | −15.5 | −12.2 | −12.4 |
| \|fFr1/fFr2\| | 4.4 | 4.2 | 6.2 | 3.2 |

Figure 9:
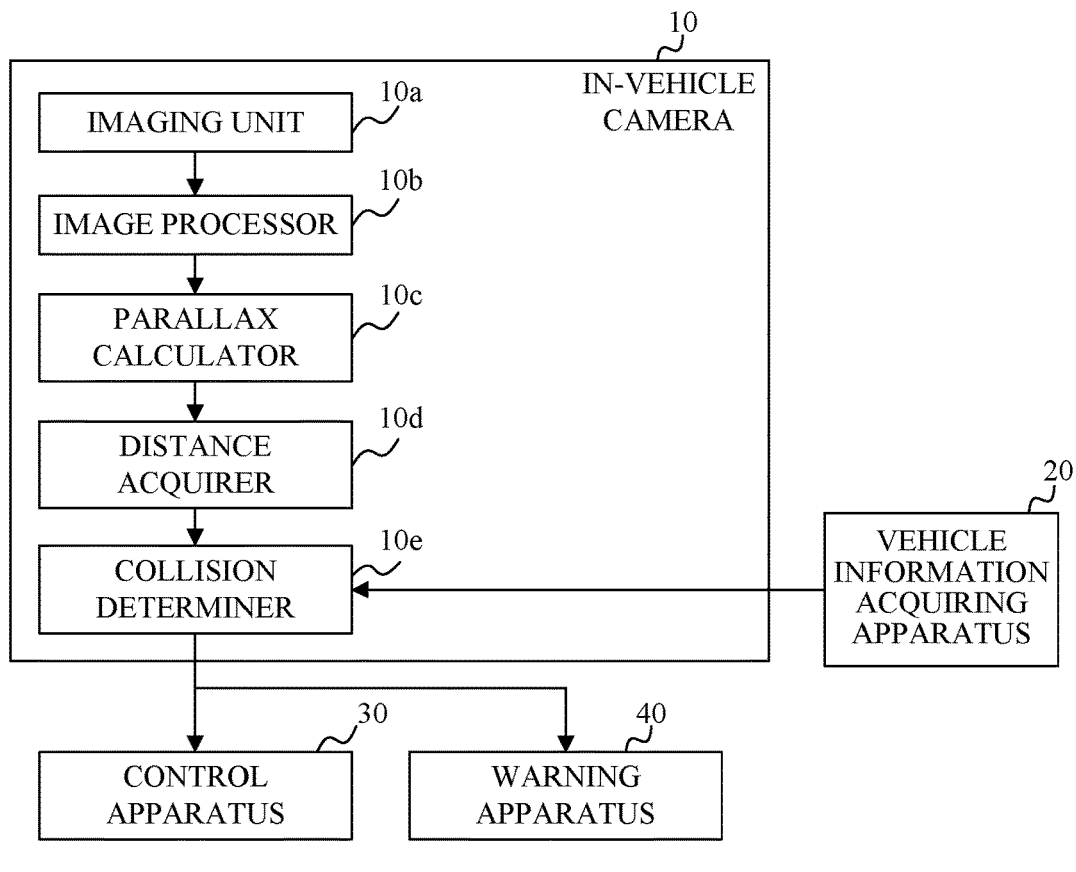
FIG. 9 is a block diagram of an on-board system having the optical system according to each example.

FIG. 9 illustrates a configuration of an in-vehicle camera 10 using the optical system according to any one of the above examples for an imaging optical system, and an on-board system (driving support device) 600 having the same. The on-board system 600 is a system held by a moving body (moving apparatus) that is movable such as an automobile (vehicle), and configured to support driving (steering) of the vehicle based on image information around the vehicle acquired by the in-vehicle camera 10.

Figure 10:
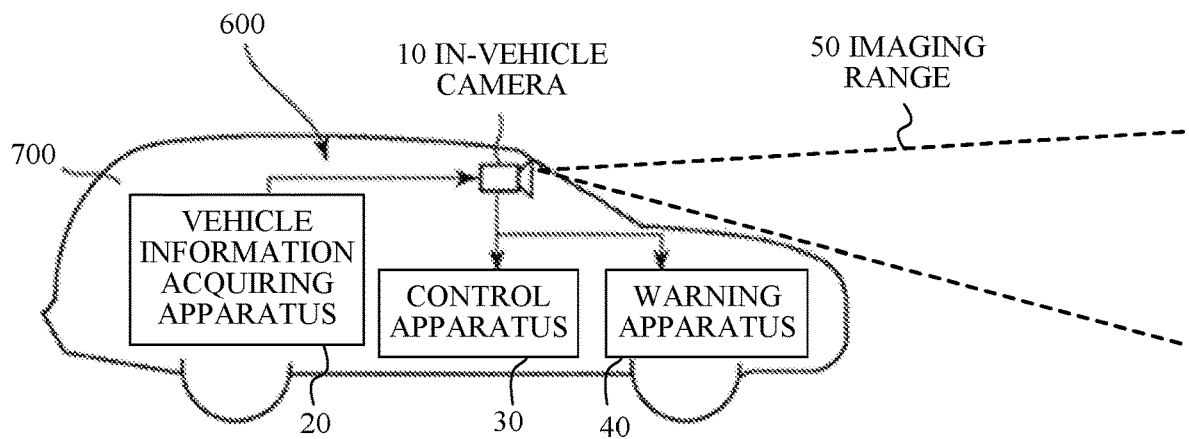
FIG. 10 is a schematic diagram of main part of a vehicle mounted with an on-board system having the optical system according to each example.

FIG. 10 illustrates a vehicle 700 as a moving apparatus that includes the on-board system 600. While FIG. 10 illustrates an imaging range 50 of the in-vehicle camera 10 set to the front of the vehicle 700, the imaging range 50 may be set to the rear or side of the vehicle 700.

As illustrated in FIG. 10, the on-board system 600 includes the in-vehicle camera 10, a vehicle information acquiring apparatus 20, a control apparatus (controller, ECU: electronic control unit) 30, and a warning apparatus (warning unit) The in-vehicle camera 10 includes an imaging unit 10a, an image processor 10b, a parallax calculator 10c, a distance acquirer 10d, and a collision determiner 10e. The image processor 10b, the parallax calculator 10c, the distance acquirer 10d, and the collision determiner 10e constitute a processing unit. The imaging unit 10a includes the optical system according to any one of the above examples and an image sensor.

Figure 11:
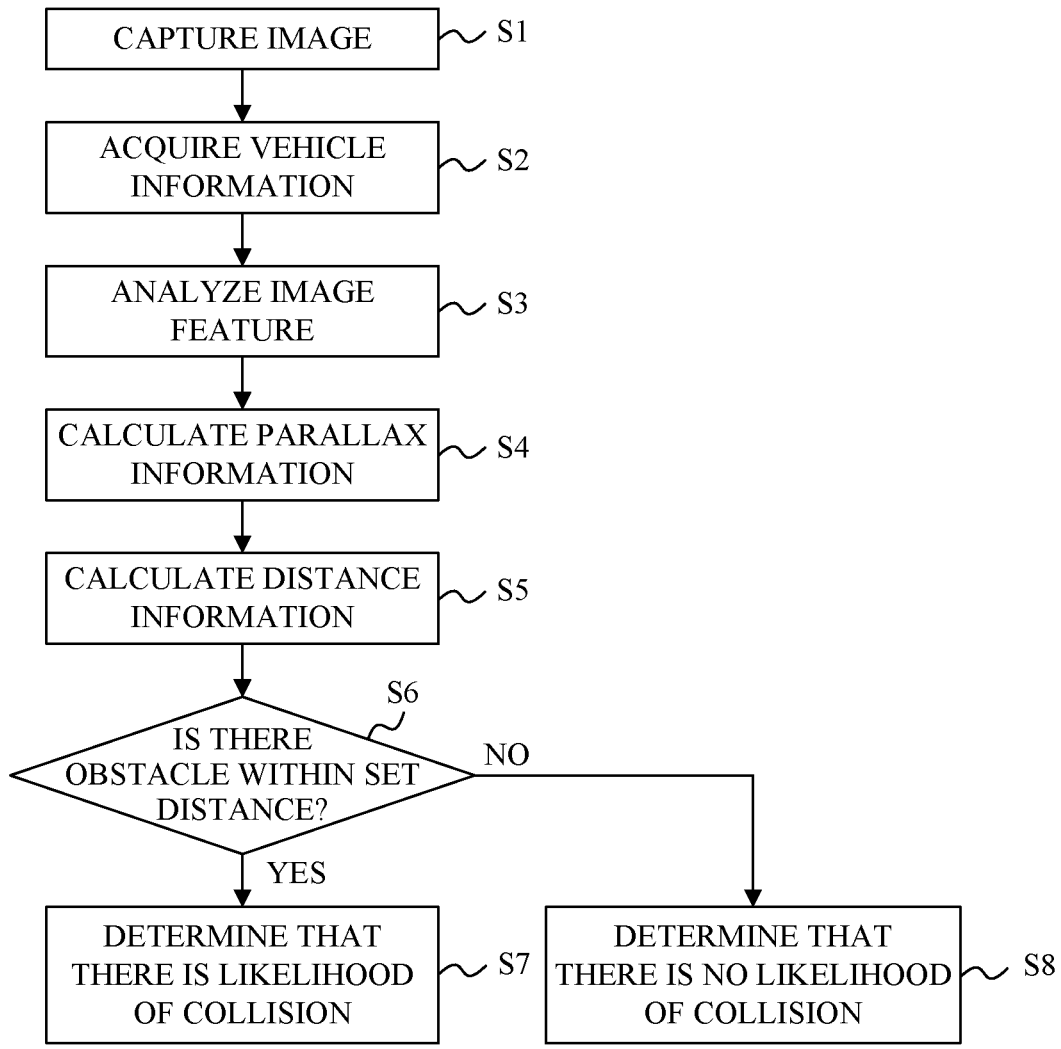
FIG. 11 is a flowchart illustrating an operation example of the on-board system having the optical system according to each example.

A flowchart of FIG. 11 illustrates an operation example of the on-board system 600. In the step S1, the on-board system 600 images, using the imaging unit an object such as an obstacle or a pedestrian around the vehicle, and acquires a plurality of image data (parallax image data).

In the step S2, vehicle information is acquired by the vehicle information acquiring apparatus 20. The vehicle information is information including a vehicle speed, a yaw rate, a steering angle, and the like of the vehicle.

In the step S3, the image processor 10b performs image processing for the plurality of image data acquired by the imaging unit 10a. More specifically, the image feature analysis is performed to analyze a feature amount such as an edge amount, an edge direction, and a density value in image data. The image feature analysis may be performed for each of the plurality of image data, or may be performed only for part of the plurality of image data.

In the step S4, the parallax calculator 10c calculates the parallax (image shift) information between the plurality of image data acquired by the imaging unit 10a. A method for calculating the parallax information can use a known method such as the SSDA method or the area correlation method, and a description thereof will be omitted. The steps S2, S3, and S4 may be performed in this order, or may be processed in parallel.

In the step S5, the distance acquirer 10d acquires (calculates) the distance information with the object imaged by the imaging unit 10a. The distance information can be calculated based on the parallax information calculated by the parallax calculator 10c and the internal parameters and external parameters of the imaging unit 10a. The distance information is information on a relative position with the object such as a distance from the object, a defocus amount, an image shift amount, etc., and may directly represent the distance value of the object in the image or indirectly represent information corresponding to the distance value.

Then, in the step S6, the collision determiner 10e determines whether or not the distance to the object is included in the preset distance range using the vehicle information acquired by the vehicle information acquiring apparatus 20 or the distance information calculated by the distance acquirer 10d. This configuration can determine whether or not the object exists within the set distance around the vehicle, and determine a likelihood of collision between the vehicle and the object. The collision determiner 5 determines that "there is a likelihood of collision" (step 7) in a case where the object exists within the set distance, and determines that there is no likelihood of collision (step 8) in a case where the object does not exist within the set distance.

Next, in a case where the collision determiner 10e determines that "there is a likelihood of collision," the collision determiner 10e notifies (transmits) the determination result to the control apparatus 30 and the warning apparatus 40. At this time, the control apparatus 30 controls the vehicle based on the determination result of the collision determiner 10e (step S6), and the warning apparatus 40 provides warning to the vehicle user (driver, passenger) (step 7) based on the determination result of the collision determiner 10e. The notification of the determination result may be made to at least one of the control apparatus 30 and the warning apparatus 40.

The control apparatus 30 can control moving of the vehicle by outputting a control signal to a driving unit (engine, motor, etc.) in the vehicle. For example, the control apparatus 30 generates a control signal for hitting the brakes, returning the gas pedal, turning the steering wheel, and applying the braking force to each wheel in the vehicle, and makes a control over the vehicle to suppress an output of the engine or the motor. The warning apparatus 40 gives a warning to the user, for example, by issuing a warning sound (alert), displaying warning information on a screen of a car navigation system, or giving vibrations to the seat belt or steering wheel.

According to the on-board system 600 described above, the above processing can effectively detect the object and avoid a collision between the vehicle and the object. In particular, by applying the optical system according to any one of the above examples to the on-board system 600, the entire in-vehicle camera 10 can be made smaller with an improved freedom degree of the arrangement, detect the object, and determine the likelihood of collision at a wide angle of view.

Various methods can be used to calculate the distance information. As an example, a pupil dividing type image sensor that includes a plurality of pixel units regularly disposed in a two-dimensional array is used for the image sensor in the imaging unit 10a. In the pupil dividing type image sensor, one pixel unit includes a microlens and a plurality of photoelectric conversion units, receives a pair of light beams that have passed through different areas in the pupil of the optical system, and outputs a pair of image data from each photoelectric conversion unit.

An image shift amount of each area is calculated by the correlation calculation between the pair of image data, and the image shift map data representing a distribution of the image shift amount is calculated by the distance acquirer 10d. Alternatively, the distance acquirer 10d may further convert the image shift amount into a defocus amount and generate defocus map data representing a distribution of the defocus amount (distribution on the two-dimensional plane of the captured image). The distance acquirer 10d may acquire the distance map data of the distance to the object converted from the defocus amount.

Each of the on-board system 600 and the vehicle (moving apparatus) 700 may include a notification apparatus (notifier) configured to notify the manufacturer of the on-board system, the seller (dealer) of the moving apparatus, and the like of the fact that the vehicle 700 has collided with the obstacle. For example, the notification apparatus can use a device that transmits information (collision information) on a collision between the vehicle 700 and the obstacle to a preset external notification destination by e-mail or the like.

Thus, in a case where the collision information is automatically notified by the notification apparatus, measures such as the inspection and repair can be immediately taken after the collision. The notification destination of the collision information may be an arbitrary destination set by the user, such as an insurance company, a medical institution, and the police. The notification apparatus may be configured so as to notify not only the collision information but also the failure information about each component and consumption information about consumables. The presence or absence of the collision may be detected by using the distance information acquired based on the output from the light receiving unit described above, or by another detector (sensor).

In this description, the on-board system 600 is applied to a driving support (collision damage reduction), but the present disclosure is not limited to this example, and the on-board system 600 is applicable to the cruise control (including adaptive cruise control) and automatic driving. The on-board system 600 is applicable not only to a vehicle such as an automobile but also to a moving body such as a ship, an aircraft, or an industrial robot. It is applicable not only to the moving body but also to various devices that utilize an object recognition such as an intelligent transportation system (ITS).

Each example can provide an optical system, an image pickup apparatus, an on-board system, and a moving apparatus, which have a wide angle of view and a long focal length in the central area, and can provide high-resolution imaging.

While the disclosure has been described with reference to embodiments, it is to be understood that the disclosure is not limited to the disclosed examples. The scope of the following claims is to be accorded the broadest interpretation so as to encompass all such modifications and equivalent structures and functions.

For example, each example has discussed a lens that corrects the visible region as a wavelength range to be corrected, but the wavelength range to be corrected is not limited to this region, and each example is also applicable to lenses with a narrower or wider wavelength range to be corrected.

The optical system according to each example is not limited to in-vehicle cameras, but is also applicable to digital still cameras, digital video cameras, mobile phone cameras, surveillance cameras, wearable cameras, medical cameras, etc.

The front unit and the rear unit of the optical system according to each example are respectively fixed (do not move in the optical axis direction), but at least part of the lenses may be movable in the optical axis direction during zooming or focusing.

This application claims the benefit of Japanese Patent Application No. 2022-097517, filed on Jun. 16, 2022, which is hereby incorporated by reference herein in its entirety.

What is claimed is:

1. An optical system comprising, in order from an object side to an image side:
a front unit having positive refractive power;
an aperture stop; and
a rear unit having positive refractive power,
wherein the front unit includes, in order from the object side to the image side, a first aspheric lens, a first negative lens, and a first positive lens,
wherein the rear unit includes, in order from the image side to the object side, a second aspheric lens, a second negative lens, and a second positive lens,
wherein the first aspheric lens includes an aspheric surface having an inflection point in a section including an optical axis, and
wherein the following inequality is satisfied:

$$2.5 \le fG1/fG2 \le 20.0$$

where fG1 is a focal length of the front unit, and fG2 is a focal length of the rear unit.

2. The optical system according to claim 1, wherein the first negative lens includes an aspheric surface having an inflection point in the section including the optical axis.

3. The optical system according to claim 1, wherein the following inequality is satisfied:

$$2.5 \le |fFr1/fFr2| \le 10.0$$

where fFr1 is a focal length of the first aspheric lens, and fFr2 is a focal length of the first negative lens.

4. The optical system according to claim 1, wherein a lens surface on the image side the first negative lens is concave.

5. The optical system according to claim 1, wherein the rear unit further includes a third positive lens disposed on the object side of the second positive lens.

6. The optical system according to claim 1, wherein at least one of the first aspheric lens and the second aspheric lens is made of a resin material.

7. The optical system according to claim 1, wherein the second negative lens and the second positive lens are cemented together.

8. The optical system according to claim 1, wherein each of a lens surface on the object side of the first aspheric lens, a lens surface on the image side of the first aspheric lens, a lens surface on the object side of the second aspheric lens, and a lens surface on the image side the second aspheric lens is aspheric.

9. The optical system according to claim 1, wherein the first aspheric lens is a lens located closest to an object in the front unit.

10. The optical system according to claim 1, wherein the second aspheric lens is a lens disposed closest to an image plane in the rear unit.

11. The optical system according to claim 1, wherein the front unit consists of, in order from the object side to the image side, the first aspheric lens, the first negative lens, the first positive lens,
wherein the rear unit consists of, in order from the image side to the object side, the second aspheric lens, the second negative lens, the second positive lens, and a third positive lens,
wherein each of the first aspheric lens and the second aspheric lens is a positive lens,
wherein each of an aspheric lens surface on the object side and an aspheric lens surface on the image side of the first aspheric lens has an inflection point in the section including the optical axis, and
wherein an aspheric lens surface on the object side of the first negative lens has an inflection point in the section including the optical axis.

12. The optical system according to claim 1, wherein the front unit consists of, in order from the object side to the image side, the first aspheric lens, the first negative lens, and the first positive lens, wherein the rear unit consists of, in order from the image side to the object side, the second aspheric lens, the second negative lens, the second positive lens, and a third positive lens, wherein the first aspheric lens is a negative lens, and the second aspheric lens is a positive lens, and wherein an aspheric lens surface on the object side of the first aspheric lens has an inflection point in the section including the optical axis.

13. The optical system according to claim 1, wherein the front unit consists of, in order from the object side to the image side, the first aspheric lens, the first negative lens, and the first positive lens, wherein the rear unit consists of, in order from the image side to the object side, the second aspheric lens, the second negative lens, the second positive lens, a third positive lens, a third negative lens, and a fourth positive lens, wherein the first aspheric lens is a positive lens, and the second aspheric lens is a negative lens, wherein each of an aspheric lens surface on the object side of the first aspheric lens and an aspheric lens surface on the image side of the first aspheric lens has an inflection point in the section including the optical axis, and wherein the third negative lens and the fourth positive lens are cemented together to form a cemented lens.

14. The optical system according to claim 1, wherein the front unit consists of, in order from the object side to the image side, the first aspheric lens, the first negative lens, the first positive lens, and a fourth positive lens, wherein the rear unit consists of, in order from the image side to the object side, the second aspheric lens, the second negative lens, the second positive lens, a third positive lens, and a third negative lens, wherein the first aspheric lens is a negative lens, and the second aspheric lens is a positive lens, wherein an aspheric surface on the object side of the first aspheric lens has an inflection point in the section including the optical axis, and wherein the third positive lens and the third negative lens are cemented together to form a cemented lens.

15. An image pickup apparatus comprising:
the optical system according to claim 1; and
an image sensor configured to perform imaging of an object through the optical system.

16. An on-board system comprising:
the image pickup apparatus according to claim 15; and
a determiner configured to determine a likelihood of collision between a moving apparatus and the object based on distance information about the object acquired from the image pickup apparatus.

17. The on-board system according to claim 16, further comprising a notification apparatus configured to notify outside of information about the collision between the moving apparatus and the object.

18. A moving apparatus comprising the image pickup apparatus according to claim 15,
wherein the moving apparatus holds the image pickup apparatus and is movable.

19. The moving apparatus according to claim 18, comprising a determiner configured to determine a likelihood of collision between a vehicle and the object based on distance information about the object acquired from the image pickup apparatus.

* * * * *